United States Patent [19]

Bourgeois

[11] Patent Number: 4,635,784

[45] Date of Patent: Jan. 13, 1987

[54] ACCUMULATING MAGAZINE

[76] Inventor: Ronald D. Bourgeois, 138 Ellison Park, Waltham, Mass. 02154

[21] Appl. No.: 657,160

[22] Filed: Oct. 3, 1984

[51] Int. Cl.$^4$ .............................................. B65G 1/00
[52] U.S. Cl. .................... 198/347; 198/429
[58] Field of Search ............ 198/347, 429, 503, 573, 198/572, 433

[56] References Cited

U.S. PATENT DOCUMENTS

| | | | |
|---|---|---|---|
| 3,122,231 | 2/1964 | Pence et al. | 198/358 X |
| 3,244,267 | 4/1966 | Berta | 198/429 X |
| 3,263,794 | 8/1966 | Burton | 198/503 X |
| 3,470,996 | 10/1909 | Lee et al. | 198/347 |
| 3,499,555 | 3/1970 | Wahle | 198/429 X |
| 4,475,643 | 10/1984 | Klingenberg | 198/347 |
| 4,499,987 | 2/1985 | Long | 198/347 |
| 4,560,057 | 12/1985 | Applegate et al. | 198/347 |

FOREIGN PATENT DOCUMENTS

| | | | |
|---|---|---|---|
| 0111745 | 6/1984 | European Pat. Off. | 198/347 |
| 2640867 | 3/1977 | Fed. Rep. of Germany | 198/347 |
| 52-8397 | 1/1977 | Japan | 198/347 |
| 1435291 | 5/1976 | United Kingdom | 198/347 |
| 939360 | 7/1982 | U.S.S.R. | 198/503 |

*Primary Examiner*—Joseph E. Valenza
*Assistant Examiner*—Jonathan D. Holmes
*Attorney, Agent, or Firm*—Joseph S. Iandiorio; William E. Noonan

[57] ABSTRACT

An accumulating magazine is provided for use with a conveyor system including an accumulation area for use alongside a conveyor system. There is a magazine including a plurality of channels generally aligned with and suspended above the conveyor system and accumulation area; the magazine is moved laterally of the conveyor system one channel at a time to move a channel from over the conveyor system to over the accumulation area and to move a channel from over the accumulation area to over the conveyor system. A gate controls the flow of product in and out of the conveyor system next to the accumulation area. Indication is provided when the magazine is full and when it is empty and the number of articles on the conveyor system next to the accumulation area is counted. There is a controller responsive to the count of product exceeding one predetermined number and the magazine not being full for actuating the gate to stop flow of product out of the conveyor system and indexing the magazine and shifting the channel full of product from over the conveyor system to over the accumulation area. The controller further responds to the count of product being beneath another predetermined number and the magazine not being empty for actuating the gate to stop flow of product into the conveyor system and indexing the magazine and shifting the channel full of product from over the accumulation area to over the conveyor system.

6 Claims, 5 Drawing Figures

ACCUMULATING MAGAZINE

FIELD OF INVENTION

This invention relates to an accumulating magazine for use with a conveyor system, and more particularly to such an accumulating magazine for small and unstable articles.

BACKGROUND OF INVENTION

There are many available accumulation devices for conveyors. In cascading accumulators, the express or main conveyor system feeds into a broadened area with sides and a funnel shaped exit. When the exit is blocked, because for example the next machine or conveyor downstream is inoperable or jammed, product slides back up along the funnel shape and sides to fill the broadened area. Such accumulators are not well suited to handling delicate or unstable goods. During backups, product can be scuffed on its bottom and sides and unstable product can be easily knocked over. In side accumulators, a second conveyor belt operating perpendicular to the main belt conveys away product that is backing up. In addition to the dangers of scuffing and spilling previously referred to, there is here also the danger that small articles can be dropped or caught between the two conveyors. Vertical conveyors lift one or a row of backlogged product off and above the overloaded main conveyor. But again, scuffing and damage are a problem and this method is not suitable for small articles the size of pill bottles and tape cassettes disposed on end. Spiral accumulators create a buffer zone by conveying the product into a spiral path or a helical path upward then across to a helical path downward. Here, as in all of these devices, there is additional motion required which risks damage to the goods, especially small, delicate, or unstable products, and wastes energy.

SUMMARY OF INVENTION

It is therefore an object of this invention to provide an improved, simple accumulation device.

It is a further object of this invention to provide such an accumulation device which can handle small, delicate and unstable goods.

It is a further object of this invention to provide such an accumulation device which does not require continuous movement of the goods and is conservative of energy.

It is a further object of this invention to provide such an accumulation device which instantly, automatically responds to compensate for an over or under supply of product.

The invention results from the realization that a truly effective and efficient accumulator can be made by using a magazine having a plurality of channels that can be moved laterally of the main conveyor to remove a line of product from the main conveyor to an adjacent accumulation area when the count of product exceeds a preset limit and to return a line of product from the accumulation area to the adjacent main conveyor when the count of product is below another preset limit.

The invention features an accumulating magazine for use with a conveyor system. There is an accumulation area for use next to a conveyor system and means for counting the number of articles on the conveyor system along the accumulation area. There is a magazine including a plurality of channels generally aligned with and suspended above the conveyor system and the accumulation area. There are means for moving the magazine laterally of the conveyor system, one channel at a time, to move a channel from over the conveyor system to over the accumulation area and to move a channel from over the accumulation area to over the conveyor system. Gate means control the flow of product into and out of the conveyor system alongside the accumulation area. There are means for indicating when a magazine is full and when it is empty. There are controller means responsive to the count of product exceeding one predetermined number and the magazine not being full for actuating the gate means to stop flow of product out of the conveyor system and actuating the means for moving to index the magazine and shift the channel full of product from over the conveyor system to over the accumulation area. The controller means are also responsive to the count of the product being beneath another predetermined number and the magazine not being empty for actuating the gate means to stop flow of product into the conveyor system and actuating the means for moving to index the magazine and shift the channel full of product from over the accumulation area to over the conveyor system.

In a preferred embodiment, the accumulation area is a low friction surface or may be a portion of the conveyor system itself. The means for counting may include a first detector at the input of the extent of the conveyor system alongside the accumulator area and a second detector at the output of the extent of the conveyor system alongside of the accumulation area and a counter which is incremented each time the first detector detects a product and is decremented each time the second detector detects a product. The gate means may include a first gate at the input of the conveyor system which extends alongside the accumulation area, and a second gate at the output of the conveyor system which extends alongside the accumulation area.

DISCLOSURE OF PREFERRED EMBODIMENT

Other objects, features and advantages will occur from the following description of a preferred embodiment and the accompanying drawings, in which.

Figure 1:
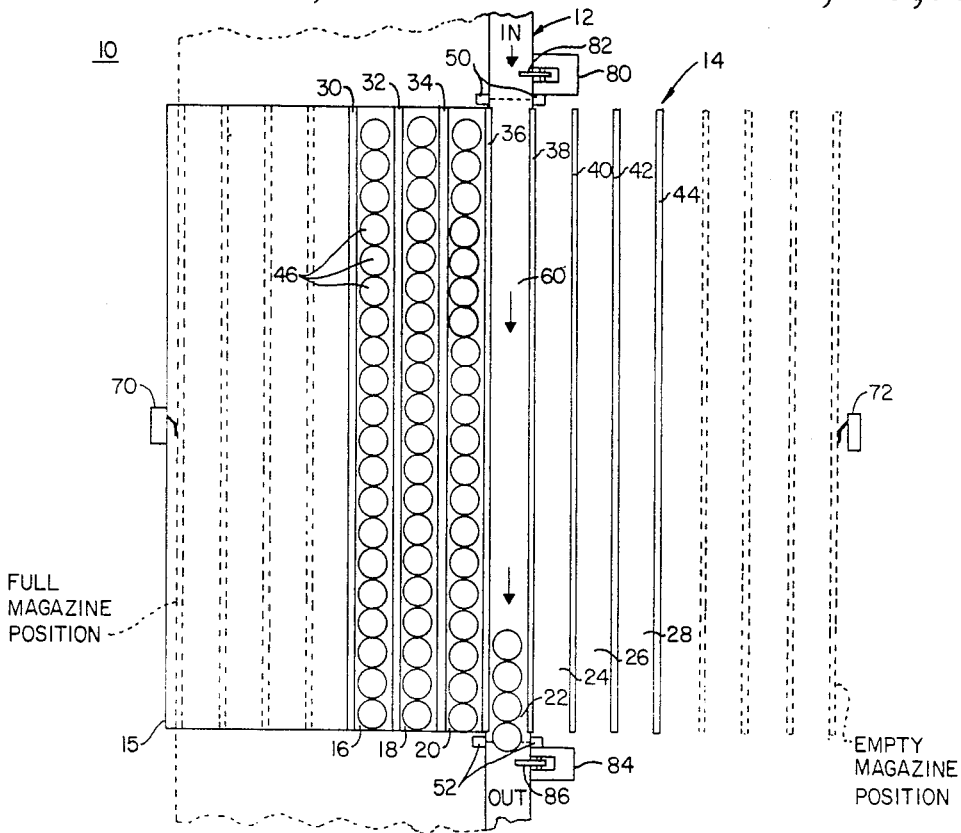
FIG. 1 is a diagrammatic top plan view of an accumulation magazine associated with a conveyor system according to this invention.

The invention may be accomplished by an accumulation magazine which includes an accumulation surface adjacent a portion of a main or express conveyor system which is generally always in motion to convey goods. There is a magazine suspended above the conveyor system and the accumulation area. The magazine includes a plurality of channels generally aligned with the main conveyor system. There are some means for stepping the magazine back and forth across the conveyor system and accumulation area, one channel at a time, in order to move a row of backed-up product from the express or main conveyor system to the accumulation area and, alternatively, to move a row of stored product from the accumulation area back on to an empty main conveyor. There are gate means for controlling the flow of product selectively into and out of the conveyor system alongside the accumulation area during the removal and return of product from the conveyor system. Some means are provided for indicating when the magazine is full and when it is empty, so that there will be no attempt to move the magazine to return a stored row of product to an empty conveyor when, in fact, there are no rows of product stored and, conversely, so that the magazine will not be commanded to move a row of product from a backed-up main conveyor to the accumulation area when the accumulation area and magazine are already full.

There are also some means for counting the number of articles on a conveyor system alongside the accumulator area. Typically, this is done with a detector such as a photo-detector at the input and output ends of the conveyor and a counter. Each time a product enters the extent of the conveyor alongside the accumulation area, the counter is incremented by one and each time a product leaves that extent of the conveyor, the counter is decremented by one. When the counter goes above a predetermined limit which varies in each given case but is typically the full number of products that will fill the main conveyor from one end to the other of its extent alongside of the accumulation area, then the magazine is moved to remove that row from the conveyor and push it into the accumulation area. Conversely, when a count below a certain number, for example below the number one, i.e. zero, is reached, the decision is made that there is a lack of product being fed along the main conveyor and so the magazine is operated to shift a row of product stored in the accumulation area to the conveyor system to attempt to maintain a steady flow during gaps in the inflow to the main conveyor system. The accumulation area is typically a low friction surface made of a material such as Teflon or Delron. If, because the products being conveyed are very unstable or very small, it is unsafe to move them from the main conveyor to the accumulation surface, then the accumulation surface may be formed from the main conveyor itself. That is, the main conveyor may be enlarged so that in effect the products, when they are being shifted to the accumulation area, are only being slid laterally along the same conveyor and held against further forward motion.

There is shown in FIG. 1 an accumulation magazine 10 according to this invention used in conjunction with a main conveyor system 12. Accumulating magazine 10 includes a magazine 14, extending over accumulation area 15 and the adjacent portion of main conveyor 12, having seven channels 16, 18, 20, 22, 24, 26 and 28 formed from eight walls 30, 32, 34, 36, 38, 40, 42 and 44. Each channel 16-28 holds twenty (20) pieces of product 46 so the predetermined upper limit in this case would be twenty. Magazine 14 is shown in a central position with three of its channels 16, 18 and 20 filled and its center channel 22 aligned over the main conveyor 12. There is a photo-detector system 50 at the input end of conveyor 12 and another 52 at the output end which may be an RUL 42 photoswitch such as available from Photoswitch, Inc. If the number or product along the segment 60 of conveyor 12 alongside surface 15 exceeds twenty, then magazine 14 is indexed one channel to the left so that channel 22 which is filled with twenty products is moved to the left one channel, as is each of the channels 16, 18 and 20, so that there are four rows of products stored on accumulation area 15. If this continues, eventually magazine 14 rests entirely over area 15, and the "magazine full" switch 70, such as an M9CTQMSA limit switch, available from Micro Switch Incorporated, is tripped. Alternatively, each time it is detected that there is no product in portion 60 of main conveyor 12, magazine 14 is shifted to the right to bring the next row of twenty products 46 onto portion 60 of conveyor 12. This continues until magazine 14 and accumulation area 15 are empty, at which point "magazine empty" switch 72 is tripped. Air cylinder operated gate 80 is shown with its arm 82 in the retracted state, and is used to control flow of product into segment 60 of main conveyor 12. A similar gate 84 with retracted arm 86 is used to prevent outflow of product from segment 60.

Figure 2:
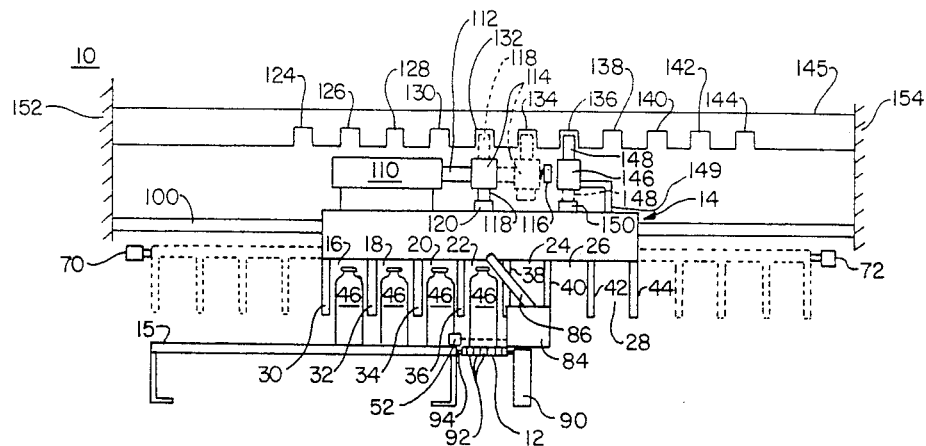
FIG. 2 is a front elevational view of the conveyor of FIG. 1.
Figures 3, 4:
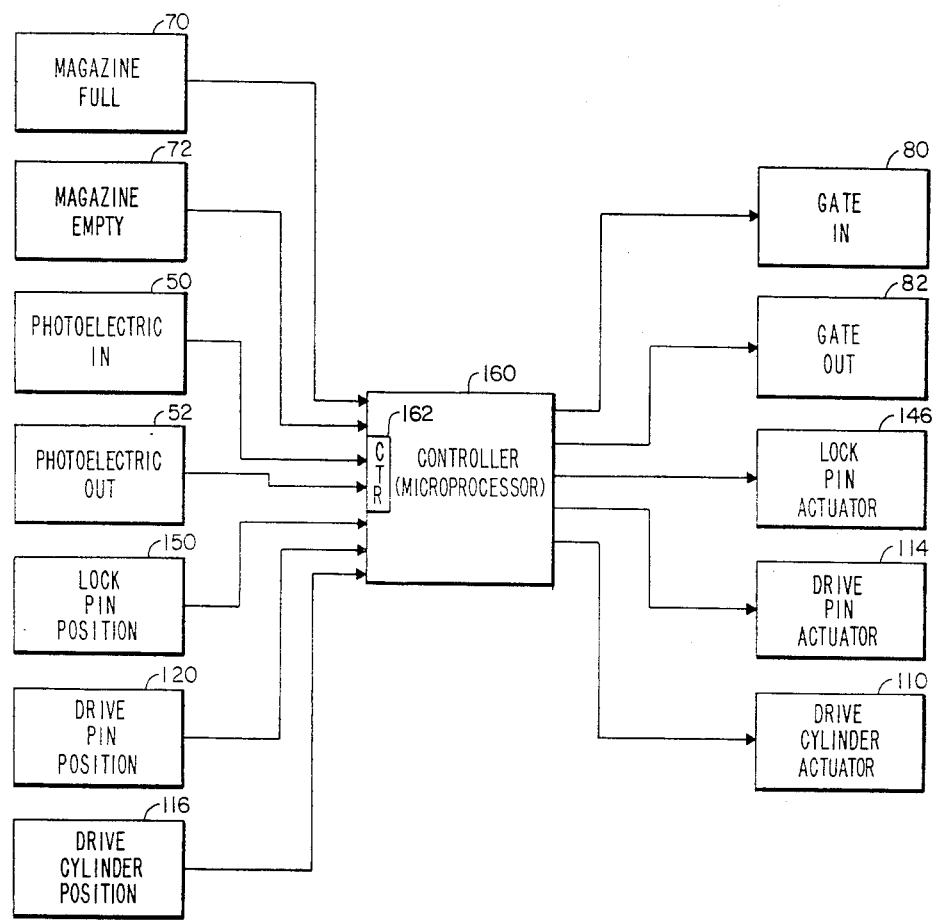
FIG. 3 is a view of a portion of FIG. 2 showing an alternative embodiment for the accumulation area.
FIG. 4 is a block diagram of the logic control circuit for operating the accumulating magazine of FIGS. 1 and 2.

Conveyor 12, FIG. 2, is driven by conventional drive means 90 and may be formed of a plurality of rollers 92 which are made of very low friction material and/or are loosely driven in order to constitute a low back pressure conveyor. The products 46 are shown as tall, narrow objects which are not very stable and so are particularly needful of the accumulating magazine of this invention. Products 46 as shown, although inherently unstable, are at least large enough not to be at risk because of the gap 94 between the edge of conveyor 12 and the beginning of accumulating area 15. If that is not the case then, as shown in FIG. 3, the entire accumulating area 15a can be an extension of conveyor 12a so that there occurs no gap 94. Magazine 14 may be mounted on gibs 100, only one of which is shown in FIG. 2, so that magazine 14 is slideable on gibs 100 fully to the left and right.

Magazine 14 is stepped, channel by channel, by means of a drive cylinder 110 having a piston 112 on which is mounted a drive pin actuator 114. Piston 112 may either be in the retracted position as shown in full lines or in the extended position as shown in phantom lines. In the extended position, it actuates drive cylinder position switch 116. Drive pin actuator 114 has a pin 118 which is either retracted, as shown in full lines, so that it trips switch 120 or it is extended as shown in phantom so that it engages one of a plurality of holes 124, 126, 128, 130, 132, 134, 136, 138, 140, 142 or 144 in beam 145. Lock pin actuator 146 includes a pin 148 which is either engaged with one of the holes 124-144 in beam 145, as shown in full lines, or in the retracted position, as shown in phantom lines where it operates switch 150. As indicated by the machine ground symbols 152 and 154, beam 145 and gibs 100 are fixed to the frame and supporting legs of the machine, as is accumulating surface 15 and conveyor 12 with its drive mechanism 90. Drive cylinder actuator 110 and lock pin acutator 146 are both fixed (actuator 146 by support 149) to move with magazine 14.

Lock pin actuator 146 normally has its pin 148 extended into one of the holes 124-144 when the magazine is in a fixed position. When it is desired to move the magazine in one direction or the other, the pin must be retracted whereupon it trips switch 150. For example, if the magazine is to be moved to the right to unload a channel from the accumulating area 15, the following sequence is followed: First, piston 112 is extended; then pin 118 is extended to engage in hole 134; then pin 148 is withdrawn and trips switch 150; then piston 112 is retracted which actually draws cylinder 110 with magazine 14 to the right; then pin 148 is extended into hole 138 and pin 118 is retracted from hole 134. Drive cylinder 110 may not be actuated since it is already in the retracted position. To move magazine 14 in the opposite direction (to the left) in order to load accumulating area 15, a similar sequence is effected. First, pin 118 is extended into hole 132, then pin 148 is retracted from hole 136; then piston 112 is extended, essentially driving cylinder 110 with magazine 14 to the left; then pin 148 is extended into hole 134. Pin 118 is retracted from hole 132, tripping switch 120 and cylinder 110 is actuated to retract piston 112.

The logic for the system is performed by controller 160, FIG. 4, which may essentially be a microprocessor such as a Micro Master Model WP 6350 programmable sequential processor including a counter 162 which responds to photo-electric detector in 50 and photo-electric detector out 52. Each time photo-electric detector 50 detects a product entering segment 60 of main conveyor 12, counter 162 is incremented, and each time photo-electric detector 52 detects a product leaving segment 60, counter 162 is decremented. Controller 160 also receives inputs from the "magazine full" switch 70, "magazine empty" switch 72, "lock pin position" switch 150, "drive pin position" switch 120 and "drive cylinder position" switch 116. Controller 160 then provides outputs to gate in 80 and gate out 82 to control the inflow and outflow of product during magazine indexing; it also controls lock pin actuator 146, drive pin actuator 114 and drive cylinder actuator 110 in order to effect the indexing of magazine 14.

Figure 5:
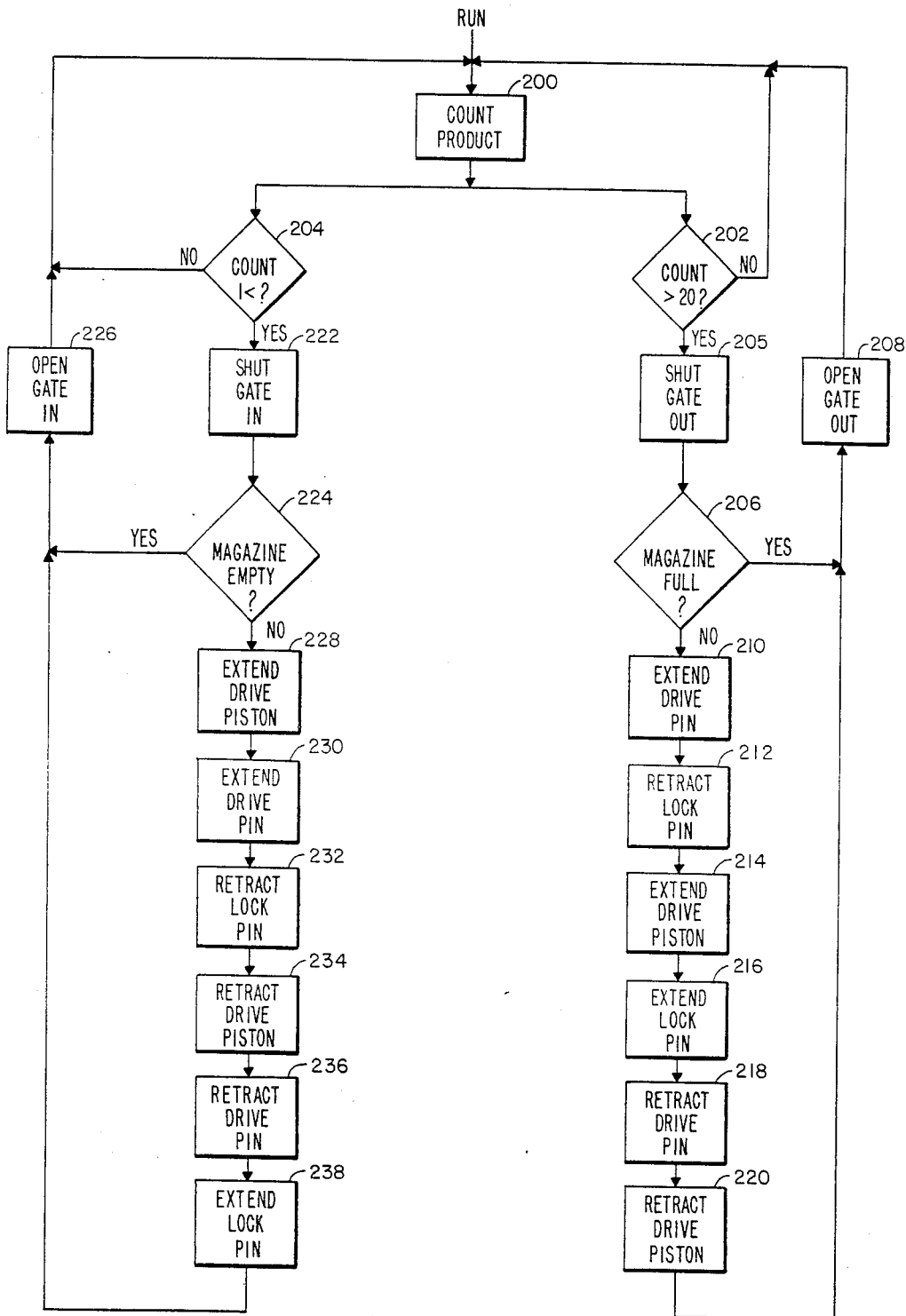
FIG. 5 is a flow chart for programming the microprocessor controller of FIG. 4.

A controller 160 is programmed according to the flow chart shown in FIG. 5. Product is continually counted by gates 80 and 82, as indicated in primary step 200. The count is continually monitored to see whether the count is greater than some predetermined number, for example twenty in step 202, or less than a predetermined number, for example the number one in step 204. If the count is not greater than twenty, then the system reverts to counting product in step 200. If, however, the count is greater than twenty, then the system in step 205 shuts gate 82 preventing outflow of product and asks the question, in step 206, "Is the magazine full?". If it is full, then it can store no more product and so the gate 82 is opened in step 208 and the system is returned to counting product, once again, in step 200. If, however, the magazine is not full then, in step 210, drive pin 118 is extended and in step 212 lock pin 148 is retracted. Drive piston 112 is then extended to step 214 and then lock pin 148 is extended in step 216. Following this, drive pin 118 is retracted in step 218 and then in step 220 drive piston 112 is retracted. After this, gate 82 is opened and the system is returned to count product in step 200.

In step 204, if the count was not less than one, then the system reverts to counting product in step 200. If, however, the count was less than one, that is it was zero, the in gate 80 is shut in step 222 and the question is asked in step 224 "Is the magazine empty?". If the answer is "yes", then gate 80 is opened in step 226 and the system reverts to count product in step 200. If, however, the magazine is not empty, then drive piston 112 is extended in step 228, drive pin 118 is extended in step 230, and in step 232 lock pin 148 is retracted. Following this, in step 234 drive piston 112 is retracted, drive pin 118 is retracted in step 236 and, finally, lock pin 148 is extended in step 238. Subsequently, gate 80 is opened in step 226 and the system is returned to counting product in step 200.

Other embodiments will occur to those skilled in the art and are within the following claims:

What is claimed is:

1. An accumulating magazine for use with a conveyor system comprising:

a planar accumulation surface disposed alongside a conveyor system, said planar accumulation surface being laterally stationary relative to said conveyor system;

a magazine including a plurality of channels generally aligned with and suspended above the conveyor system and said planar accumulation surface;

means for linearly moving said magazine laterally of said conveyor system one channel at a time to move a channel from over said conveyor system to over said planar accumulation surface and to linearly move a channel from over said planar accumulation surface to over said conveyor system;

gate means for controlling flow of product into and out of said conveyor system alongside said planar accumulation surface;

means for indicating when said magazine is full and when it is empty;

means for counting the number of articles on the conveyor system along said planar accumulation surface; and controller means, responsive to the count of product exceeding one predetermined number and said magazine not being full for actuating said gate means to stop flow of product out of said conveyor system and actuating said means for moving to index said magazine and shift a channel with product from over said conveyor system to over said planar accumulation surface and responsive to the count of product being beneath another predetermined number and said magazine not being empty for actuating said gate means to stop flow of product into said conveyor system and actuating said means for moving to index said magazine and shift a channel with product from over said planar accumulation surface to over said conveyor system.

2. The accumulating magazine of claim 1 in which said planar accumulation surface is a low friction surface.

3. The accumulating magazine of claim 1 in which said planar accumulation surface is a portion of said conveyor system.

4. The accumulating magazine of claim 1 in which said means for counting includes a first detector at the input of said conveyor system alongside said planar accumulation surface, a second detector at the output of said conveyor system alongside said planar accumulation surface, and a counter which is incremented each time said first detector detects a product and is decremented each time said second detector detects a product.

5. The accumulating magazine of claim 1 in which said gate means includes a first gate at the input of said conveyor system alongside said planar accumulation surface, and a second gate at the output of said conveyor system alongside said planar accumulation surface.

6. An accumlating magazine for use with a conveyor system comprising:

a planar accumulation area disposed alongside a conveyor system, said planar accumulation area being laterally stationary relative to said conveyor system;

a magazine including a plurality of channels generally aligned with and suspended above the conveyor system and said accumulation area;

means for linearly moving said magazine laterally of said conveyor system one channel at a time to move a channel from over said conveyor system to over said planar accumulation area and to linearly move a channel from over said planar accumulation area to over said conveyor system;

gate means for controlling flow of product into and out of said conveyor system alongside said planar accumulation area;

means for indicating when said magazine is full and when it is empty;

means for counting the number of articles on the conveyor system along said planar accumulation area; and controller means, responsive to the count of product exceeding one predetermined number and said magazine not being full for actuating said gate means to stop flow of product out of said conveyor system and actuating said means for moving to index said magazine and shift a channel with product from over said conveyor system to over said planar accumulation area and responsive to the count of product being beneath another predetermined number and said magazine not being empty for actuating said gate means to stop flow of product into said conveyor system and actuating said means for moving to index said magazine and shift a channel with product from over said planar accumulation area to over said conveyor system, said planar accumulation area including a low friction surface for sliding product laterally over said planar accumulation area.

* * * * *